United States Patent [19]

Sylvester et al.

[11] 4,145,497

[45] Mar. 20, 1979

[54] URANIUM-CONTAINING MIXED CATALYSTS AND THEIR USE FOR THE POLYMERIZATION OF OLEFINS

[75] Inventors: Gerd Sylvester, Leverkusen; Josef Witte, Cologne; Gunter Marwede, Leverkusen, all of Fed. Rep. of Germany

[73] Assignee: Bayer Aktiengesellschaft, Leverkusen, Fed. Rep. of Germany

[21] Appl. No.: 801,465

[22] Filed: May 31, 1977

[30] Foreign Application Priority Data

Jun. 5, 1976 [DE] Fed. Rep. of Germany ....... 2625390

[51] Int. Cl.$^2$ .......................... C08F 4/62; C08F 36/06
[52] U.S. Cl. .................................... 526/164; 252/428; 252/429 B; 252/429 C; 252/431 C; 526/114; 526/115; 526/122; 526/133; 526/137; 526/150; 526/151; 526/153; 526/157; 526/340.4

[58] Field of Search ............... 252/428, 429 B, 429 C, 252/431 C; 526/114, 115, 122, 123, 137, 153, 157, 164, 133, 149, 150, 151

[56] References Cited

U.S. PATENT DOCUMENTS

| | | | |
|---|---|---|---|
| 3,676,411 | 7/1972 | Throckmorton et al. | 526/157 |
| 3,935,175 | 1/1976 | Tugli et al. | 526/157 |

*Primary Examiner*—Edward J. Smith
*Attorney, Agent, or Firm*—Connolly and Hutz

[57] ABSTRACT

Uranium-containing mixed catalysts containing uranium in the formal oxidation state +4 as uranium salts of carboxylic acids, a Lewis acid, and an organometallic aluminum compound are prepared and can be used for stereospecific polymerization of diolefins or mixtures of diolefins and monoolefins.

9 Claims, No Drawings

URANIUM-CONTAINING MIXED CATALYSTS AND THEIR USE FOR THE POLYMERIZATION OF OLEFINS

This invention relates to uranium-containing organometallic mixed catalysts and to their use for the stereospecific polymerisation or copolymerisation of diolefins and of mixtures of diolefins and monoolefins. More particularly, the invention relates to a process for the production of polybutadiene containing more than 97% of cis-1,4-units.

It has long been known that the polymerisation of diolefins is accelerated by uranium-containing catalysts.

Thus, U.S. Pat. No. 3,065,217 for example describes a catalyst produced from uranium metal, aluminium trichloride and a metal alkyl which catalyses diolefins to form cis-configurated polymers. In addition, it is known from German Auslegeschrift No. 1,420,456, that diolefins form polymers with the 1,4-configuration in the presence of organometallic uranium compounds as catalyst. Finally, U.S. Pat. No. 3,676,411 mentions the fact that diolefins, especially butadiene, are polymerised by mixed catalysts consisting of a uranium salt of carboxylic acids, trialkylaluminium or dialkylaluminium hydride and a Lewis acid. The uranium compounds described in column 2, lines 26 to 35 of this U.S. Patent Specification do not form very active catalysts. The conversions obtained are only moderate despite the large quantities of catalyst and very long reaction times which are required.

It is known from German Offenlegungsschrifts Nos. 2,257,786 and 2,359,586 that a few special uranium compounds are suitable for the production of more active catalysts which polymerise butadiene to form products with a very high proportion (more than 96%) of cis-1,4-units. However, all the uranium compounds used for producing the catalysts are extremely sensitive to atmospheric oxygen and moisture. In some cases, the uranium compounds are even thermally unstable and actually decompose at temperatures below room temperature. These properties make them very difficult to handle and prevent them from being widely used on a commercial scale.

The Italian priority Application 32206/A-72 on which German Offenlegungsschrift No. 2,359,586 is based and which has meanwhile been published as Italian Patent Specification No. 971,308 additionally mentions the possibility of using uranium formate and uranium acetate as mixed-catalyst components. However, these two compounds have been deleted at the time the corresponding German Application was filed.

In an Article by the same Applicants which appeared in Rubber Chemistry and Technology, 47, No. 5, page 1180 (1975) the uranium salts of carboxylic acids are expressly mentioned as unsuitable. Highly active catalysts are only obtained with the II-allyl compounds $U(C_3H_5)_4$ and $U(C_3H_5)_3X$ and with compounds from the group comprising uranium alkoxides, especially $U(OCH_3)_4$.

The object of the present invention is to develop stable uranium-containing mixed catalysts which can be conveniently handled on a commercial scale, and to provide a process for the highly specific polymerisation or copolymerisation of diolefins, optionally in admixture with monoolefins.

In contrast to the opinion expressed in the above-mentioned literature reference, some uranium (IV) carboxylates, in conjunction with suitable cocatalysts, are capable of quickly catalysing the reaction of diolefins to give high yields of high-grade products containing more than 97% of cis-1,4-units and less than 1% of 1,2-units.

Accordingly, the present invention provides mixed catalysts consisting of:
 (a) uranium salts of carboxylic acids,
 (b) Lewis acids and
 (c) aluminium alkyls and/or alkyl aluminium hydrides, characterised by the fact that component (a) is a salt of uranium, present in the formal oxidation state +4, of a carboxylic acid containing at least 3 carbon atoms.

The present invention also provides a process for the polymerisation of diolefins or mixtures of diolefins with monoolefins, wherein polymerisation is carried out in the presence of the above-mentioned mixed catalysts, and to the polymers obtained by this process.

Component (a) may be a compound corresponding to the general formula

where the groups represented by R, which may be the same or different, are an unsubstituted, saturated or unsaturated alkyl radical with 2 to 30 carbon atoms, the carboxyl group being attached to a primary, secondary or tertiary carbon atom, a cycloaliphatic alkyl radical with 3 to 12 carbon atoms or an aromatic radical with 6 to 24 carbon atoms. The alkyl, cycloalkyl or aromatic radicals may also be substituted once or several times, preferably 1 to 3 times, by the following groups: fluorine, chlorine, bromine, iodine, hydroxy, nitro, amino,

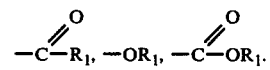

$R_1$ has the same meaning as the unsubstituted R, although the sum of the carbon atoms in R and $R_1$ should amount to between 3 and 30 in the case of saturated or unsaturated alkyl radicals.

Preferred uranium compounds are those in which the groups represented by R, which may be the same or different, are straight-chain or branched chain saturated alkyl radicals with 2 to 17 carbon atoms, cycloaliphatic radicals with 5 to 7 carbon atoms or an aromatic radical with 6 to 18 carbon atoms, the radical R optionally containing the substitutents already mentioned.

The following carboxylic acids are mentioned by way of example: propionic acid, α-chloropropionic acid, β-chloropropionic acid, α,α-dichloropropionic acid, α-bromopropionic acid, β-iodopropionic acid, n-butyric acid, β-chlorobutyric acid, γ-bromobutyric acid, isobutyric acid, n-valeric acid, valeric acid, pivalic acid, n-caproic acid, δ-chloro-n-caproic acid, isocaproic acid, hexane-1-carboxylic acid, hexane-2-carboxylic acid, methyl diethyl acetic acid, heptane-1-carboxylic acid, heptane-3-carboxylic acid, 2-methyl hexane-2-carboxylic acid, triethyl acetic acid, octane-1-carboxylic acid, nonane-1-carboxylic acid, lauric acid, myristic acid, palmitic acid, α-bromopalmitic acid, stearic acid, tricosane carboxylic acid, melissic acid, pentene-4-carboxylic acid, angelic acid, 2,6-dimethyl-2-heptanoic acid (7), oleic acid, cyclopropane carboxylic acid, cyclopentane carboxylic acid, cyclohexane carboxylic acid, benzoic acid, o-chlorobenzoic acid, m-chlorobenzoic acid, p-chlorobenzoic acid, α-naphthoic acid, β-napthhoic acid, phenyl acetic acid, triphenyl acetic acid, tricyclohexyl acetic acid, mandelic acid, o-toluylic acid, m-toluylic acid, p-toluylic acid, o-nitrobenzoic acid, m-nitrobenzoic acid, salicyclic acid, anthracene-9-carboxylic acid, naphthenic acids.

Suitable uranium compounds are, for example, uranium(IV) cyclohexane carboxylate, uranium(IV)benzoate, uranium(IV)o-chlorobenzoate, uranium(IV)-2-ethyl hexanoate, uranium(IV)phenyl acetate, uranium(IV)palmitate, uranium(IV)butyrate and uranium(IV)propionate.

It is also possible to use uranium compounds produced from mixtures of carboxylic acids or their derivatives. One example of such products is the commercially used Versatic Acid$^R$ (R = registered trade mark of the Shell company), a mixture of saturated carboxylic acids of the composition $C_9H_{18}O_2$ to $C_{11}H_{22}O_2$ with a boiling range from 140° to 162° C. and with a proportion of 90% of the carboxylic acids containing a tertiary carbon atom adjacent the carboxyl group, and 10% of the carboxylic acids containing a corresponding secondary carbon atom.

The uranium(IV)carboxylates may be produced by methods described in the literature. The Journal of Inorganic and Nuclear Chemistry 27, 265–266, (1965) describes for example the production of uranium(IV)isobutyrate, uranium(IV) isovalerate, uranium(IV)caproate and uranium(IV)benzoate. The Journal of Inorganic and Nuclear Chemistry 28, 1385–95 (1966) describes inter alia uranium(IV)heptanoate, whilst Zeitschrift fur anorganische und allgemeine Chemie 346, 332–336 (1966), describes uranium(IV)laurate, uranium(IV)myristate, uranium(IV)palmitate and uranium(IV)stearate.

It is also possible to use the known processes for the production of uranium(IV)formate and uranium(IV)acetate for similarly producing the uranium compounds of the higher carboxylic acids.

So-called Lewis acids are used as component (b). Reference is made by way of example to the organometallic halides in which the metal atom belongs to Groups 2a, 3a, and 4a of the Periodic Table*, and halides of the elements of Groups 3a,4a,4b, 5a, 6b, and 8 of the Periodic System. Particular emphasis is given to alkyl aluminium bromides or chlorides and to aluminium, tin, antimony, phosphorus, titanium and boron halides. Representatives of these classes are, for example, aluminium bromide, aluminium chloride, methyl aluminium dibromide, methyl aluminium dichloride, ethyl aluminium dibromide, ethyl aluminium dichloride, butyl aluminium dibromide, butyl aluminium dichloride, dimethyl aluminium bromide, dimethyl aluminium chloride, diethyl aluminium bromide, diethyl aluminium chloride, dibutyl aluminium bromide, dibutyl aluminium chloride, methyl aluminium sesquibromide, methyl aluminium sesquichloride, ethyl aluminium sesquibromide, ethyl aluminium sesquichloride, tin(II)chloride, tin(II)bromide, antimony trichloride, antimony pentachloride, phosphorus trichloride, phosphorus pentachloride, tin tetrachloride, titanium tetrachloride, boron trifluoride 6 (*) Handbook of Chemistry and Physics, 45.Ed. 1964–65, published by The Chem. Rubber Co., 2310 Superior Ave. N.E., Cleveland, Ohio.

It is preferred to use aluminium tribromide, aluminium trichloride, methyl aluminium dichloride, ethyl aluminium dichloride, butyl aluminium dichloride, dimethyl aluminium chloride, diethyl aluminium chloride, dibutyl aluminium chloride, trimethyl dialuminium trichloride and triethyl dialuminium trichloride, and particularly preferred to use aluminium tribromide, ethyl aluminium dichloride, diethyl aluminium chloride and triethyl dialuminium trichloride.

Component (c) of the mixed catalyst system consists of aluminium alkyls and/or alkyl aluminium hydrides and preferably of trialkyl aluminium and dialkyl aluminium hydrides. Representative examples of these classes are trimethyl aluminium, triethyl aluminium, tri-n-propyl aluminium, triisopropyl aluminium, tri-n-butyl aluminium, triisobutyl aluminium, tripentyl aluminium, trihexyl aluminium, tricyclohexyl aluminium, trioctyl aluminium, triphenyl aluminium, tribenzyl aluminium, diethyl aluminium hydride, dipropyl aluminium hydride, dibutyl aluminium hydride, diphenyl aluminium hydride and dibenzyl aluminium hydride.

Of these compounds, it is preferred to use triethyl aluminium, tri-n-propyl aluminium, triisopropyl aluminium, tri-n-butyl aluminium, triisobutyl aluminium, trihexyl aluminium and tricyclohexyl aluminium, and particularly preferred to use tri-n-butyl aluminium and triisobutyl aluminium.

The molar ratio between components (a), (b) and (c) may be varied within wide limits. The molar ratio of (a):(b) amounts to between 100:1 and 1:20, preferably to between 5:1 and 1:10 and, with particular preference, to between 3:1 and 1:3. The molar ratio of (a):(c) amounts to between 1:10 and 1:200, preferably to between 1:20 and 1:80 and, with particular preference, to between 1:20 and 1:40.

The catalyst may be produced by reacting components (a), (b) and (c) either simultaneously or successively in any order either in the presence or absence of an inert solvent.

A small quantity of the monomer may be present during this reaction. However, it is preferred to adopt the following procedure: component (a) is initially reacted with component (b) either in the presence or absence of an inert solvent, for example, toluene, hexane or, preferably, cyclohexane, at a temperature above the melting point and below the boiling point of the solvent used, preferably at a temperature of from 0 to 50° C. The reaction time between these two components may be varied within wide limits. For economic and practical reasons, the reaction time is preferably between 5 and 30 minutes. Thereafter, component (c) is added to the reaction product with stirring. For this part of the reaction, and for the subsequent ageing of the catalyst, the temperature may be selected within the range delimited by the melting and boiling points of the solvent. The reaction temperature is preferably in the range from 0 to 50° C. and ageing is preferably carried out at room temperature. The activity of the catalyst is not at its optimum immediately after the addition of component (c). It gradually increases and reaches its maximum value after a period ranging from a few minutes to about 24 hours. The catalyst generally retains this activity for several weeks, so that it may be used 5 minutes to more than 4 weeks after the addition of component (c). However, ageing is preferably carried out over a period ranging from 20 minutes to 48 hours.

The uranium-containing mixed catalysts according to the invention may be used for the polymerisation of diolefins or of mixtures of diolefins and monoolefins.

The mixed catalyst is added to the monomers to be reacted in a quantity sufficient to produce a catalytic effect. This quantity may be experimentally determined by the average expert.

It is preferred to add from 0.002, more preferably 0.01 to 1.5 mMole of the catalyst, based on component (a), per 100g of monomer.

Examples of diolefins are 1,3-butadiene, isoprene, 1,3-pentadiene, 2,3-dimethyl-1,3-butadiene and 1,3-hexadiene, whilst ethylene, propylene, butylene, pentene or hexene for example may be used as monoolefins.

Polymerisation is carried out either in the presence or absence of solvents but preferably in the presence of solvents. These solvents must be inert with respect to the catalyst system used. Suitable solvents are, for example, aromatic, aliphatic and cycloaliphatic hydrocarbons. It is preferred to use non-aromatic solvents, such as n-hexane, isohexane, heptane and cyclohexane, cyclohexane being particularly preferred.

The polymerisation temperature is in the range from −80° C. to 100° C. and preferably in the range from 0° C. to 80° C.

The polymerisation process according to the invention may be carried out both continuously and also in batches.

In a standard embodiment of the process according to the invention, the required quantity of the preformed catalyst is added to a mixture of cyclohexane and 5 to 30 parts by weight, preferably 10 to 20 parts by weight, of butadiene. The polymerisation reaction begins immediately after the catalyst has been added. At temperature of around 40° C., conversions of more than 90% are obtained after 30 minutes to 5 hours.

After the required conversion has been reached, the catalyst is deactivated by the addition of small quantities of, for example, water, ammonia, amines or alcohols. Standard stabilisers are added to the polymer solutions in the usual quantities before working up. Examples of suitable stabilisers are sterically hindered phenols or aromatic amines for example, 2,6-di-tert.-butyl-4-methyl phenol.

The polymers are isolated by precipitation with a nonsolvent, for example, methanol, ethanol, acetone or, preferably, by steam distillation of the solvent. Drying is carried out by the usual methods, for example in a drying cabinet or in a screw dryer.

The polybutadiene for example produced in accordance with the invention contains $\geq$ 97% of cis-1,4-double bonds. It shows distinctly improved processibility in comparison with known commercially available products. Preferred applications are motor vehicle tires and industrial rubber articles.

the invention is illustrated by the following Examples:

EXAMPLE 1

(a) Production of the catalyst 0.15 mMole of AlBr$_3$ was added to a suspension of 0.3 mMole of uranium tetrabenzoate in 15 ml of anhydrous nitrogen-saturated cyclohexane. The mixture was stirred for 10 minutes at room temperature in the absence of air and 7.5 mMole of Al(iC$_4$H$_9$)$_3$ were then added, followed by stirring for another 2 hours.

(b) Polymerisation 200 ml of boiling cyclohexane were introduced as solvent into a 500 ml capacity glass bottle. A vigorous stream of nitrogen was then introduced into the liquid for 2.5 minutes, after which the bottle was closed by a rubber stopper and a crown cork of metal which had been bored through in such a way that injection needles could be inserted. After cooling, 0.1 mMole of the catalyst produced in accordance with Example (1a) was introduced into the bottle through a syringe with an injection needle. 20 g of liquid monomer were then introduced through the injection needle which was directly connected to a butadiene-containing cylinder.

The bottle containing the reaction mixture was left standing for 3 hours at 25° C. Thereafter the bottle was decorked and its contents were precipitated with 0.5 liter of ethanol which contained 0.5% of an antioxidant.

The coagulated polymer was dried in vacuo at 50° C. until constant in weight. The yield of solid polymer amounted to 18.3 g (91.5%, based on the butadiene used). The inherent viscosity ($\eta_{inh} = in\ \eta/c$) of a 0.2% solution of the polymer in toluene at 25° C. amounted to 4.06 dl/g. Determination of the microstructure by infrared spectroscopy produced the following results:
98.7% of cis-1,4-units
0.7% of trans-1,4-units
0.6% of 1,2-units

EXAMPLES 2–6

These Examples show that a variety of different Lewis acids may be used as component (b) and that the high stereospecificity of the butadiene polymerisation is not affected.

The catalysts were produced in the same way as described in Example (1a). They were used for polymerisation 18 hours after the addition of component (c). Polymerisation was carried out in a nitrogen-purged vessel equipped with a stirrer into which an approximately 15% solution of butadiene in cyclohexane was initially introduced, followed by addition of the catalyst.

The reaction vessel was surrounded by a jacket through which water at a temperature of from 0 to 90° C. could be circulated. The reaction temperature was measured by a thermometer extending into the vessel. After the required reaction time, the catalyst was deactivated with a mixture of cyclohexane and ethanol and the polymer was precipitated with approximately 1.5 times the quantity of ethanol. 0.3% (based on polybutadiene) of an antioxidant had been added to the ethanol. The coagulated polymer was dried in vacuo at 50° C. until constant in weight. The test conditions and results are set out in the following Table 1.

Table 1

| | Catalyst | | | | Polymerisation | | | | | |
|---|---|---|---|---|---|---|---|---|---|---|
| Example No. | a) | b) | c) | molar Ratio a:b:c | mMole U/100 g of butadiene | Temp. | Reaction time | Yield | ln$\eta$r/c | % cis 1,4 |
| 2 | U(oct)$_4$ | AlBr$_3$ | Al(iC$_4$H$_9$)$_3$ | 1 : 0.5 : 25 | 0.15 | 40° | 3 h | 96% | 2.5 | 98.9 |
| 3 | " | EtAlCl$_2$ | " | 1:1:25 | 0.17 | 40° | 3 h | 87% | 3.3 | 98.2 |
| 4 | " | Et$_3$Al$_2$Cl$_3$ | " | 1:1:25 | 0.25 | 40° | 3 h | 99% | 3.5 | 98.0 |
| 5 | " | EtAlCl$_2$ | " | 1 : 1.5 : 25 | 0.15 | 40° | 3 h | 82% | 3.3 | 98.3 |

Table 1-continued

| Example No. | Catalyst a) | b) | c) | molar Ratio a:b:c | Polymerisation mMole U/100 g of butadiene | Temp. | Reaction time | Yield | ln ηr/c | % cis 1,4 |
|---|---|---|---|---|---|---|---|---|---|---|
| 6 | " | AlCl₃ | " | 1:0.5 | 0.3 | 25° | 3 h | 22% | 2.1 | 97.4 |

EXAMPLES 7–11

These Examples show how the yield and sterospecificity are affected by changes in the ratio of component (a) to component (c), and that the molecular weight of the polymer can be regulated in this way. The catalyst were produced and polymerisation was carried out in the same way as described in Example 1. The results are set out in the following Table 2.

Table 2

| Example | U:AlBr₃:Al(i-C₄H₉)₃ | Butadiene g | Yield g | % | Microstructure % cis-1,4 | % trans-1,4 | % 1,2 | ln ηr/c [dl/g] |
|---|---|---|---|---|---|---|---|---|
| 7 | 1:0.5:10 | 23.2 | 1.4 | 6 | 98.1 | 1.3 | 0.6 | 4.76 + gel |
| 8 | 1:0.5:15 | 21.6 | 0.7 | 6 | 97.8 | 1.5 | 0.7 | 4.91 + gel |
| 9 | 1:0.5:20 | 22.0 | 16.3 | 74 | 98.9 | 0.5 | 0.6 | 3.76 |
| 10 | 1:0.5:25 | 19.2 | 17.6 | 92 | 98.5 | 0.9 | 0.6 | 4.03 |
| 11 | 1:0.5:30 | 20.8 | 15.6 | 75 | 98.8 | 0.7 | 0.5 | 3.3 |

EXAMPLES 12–18

These Examples show that suitable uranium compounds other than $U(C_6H_5CO_2)_4$ and $U(C_7H_{15}CO_2)_4$ can be used and that extremely active catalysts can be also be produced with other uranium carboxylates.

The catalysts were produced by the method described in Example (1a) and with the component ratio specified in that Example. In all the Examples AlBr₃ was used as the Lewis acid (b) and Al(i-C₄H₉)₃ as component (c).

Polymerisation was carried out in cyclohexane at 25° C. in the same way as described in Example (1b). The reaction time was 3 hours.

The results are set out in Table 3.

Table 3

| Example | U-compound | mMole of U per 100 g of butadiene | Yield % | Microstructure % cis-1,4 | % trans-1,4 | % 1,2- | ln ηr/c [dl/g] |
|---|---|---|---|---|---|---|---|
| 12 | 0.1 mMole U(ClC₆H₄CO₂)₄ | 0.5 | 67 | 98.6 | 0.8 | 0.6 | 4.02+traces of gel |
| 13 | 0.1 mMole U(C₁₅H₃₁CO₂)₄ | 0.5 | 15 | 97.9 | 1.3 | 0.8 | 1.63+gel |
| 14 | 0.1 mMole U(C₂H₅CO₂)₄ | 0.5 | 97 | 98.2 | 1.4 | 0.5 | ++ |
| 15 | 0.1 mMole U(C₃H₇CO₂)₄ | 0.5 | 80 | ++ | | | ++ |
| 16 | 0.1 nMole U(C₆H₁₁CO₂)₄ | 0.4 | 94 | 98.7 | 0.7 | 0.6 | 3.32 |
| 17 | 0.1 mMole U(C₆H₅CH₂CO₂)₄ | 0.5 | 90 | 98.3 | 1.0 | 0.7 | 4.12 |
| 18 | 0.1 mMole U(vers.)₄⁺ | 0.5 | 99 | 98.3 | 0.8 | 0.9 | 2.40 |

+Uranium salt of the Versatic Acid mixture
++Not measured

EXAMPLES 19–22

These Examples show that high yields of polybutadiene can also be obtained using lower concentrations of catalyst than in the preceding Examples.

The catalyst was produced by the method described in Example (1a).

The pre-formation time was 24 hours.
Polymerisation was carried out in the same way as described in Example (2) except that the quantities of catalyst indicated in the following Table 4 were used.

Table 4

| Example | CATALYST a) | b) | c) | g of buta- (molar ratio) | Polymerisation mMole of U per diene | Temp. | Time | Yield |
|---|---|---|---|---|---|---|---|---|
| 19 | U(C₇H₁₅CO₂)₄ | AlBr₃ | Al(i-C₄H₉)₃ | 1:0.5:25 | 0.16 | 20° C | 3 h | 100% |
| 20 | " | " | " | " | 0.08 | 45° C | 3 h | 100% |
| 21 | " | " | " | " | 0.06 | 55° C | 4 h | 100% |
| 22 | " | " | " | 1:0.8:25 | 0.02 | 55° C | 5 h | 85% |

EXAMPLE 23

This Examples describes the polymerisation of isoprene. The catalyst was produced in the same way as described in Example (1a). Polymerisation was carried out in the same way as described in Example (1b), except that 30 g of isoprene were used instead of butadiene and the reaction temperature was 50° C.

The yield of solid polymers amounted to 3.4 g (11%).

EXAMPLE 24

The catalyst was produced as described in Example (1a) from $U(C_7H_{15}CO_2)_4$, AlBr₃ and Al(i-C₄H₉)₃ in a molar ratio of 1:0.5:25 and was aged for 17 hours. Polymerisation was carried out in the same way as described in Example 2.

The catalyst was added to a 12% solution of butadiene in cyclohexane in such a quantity that the concentration of catalyst amounted to 0.1 mMole/1. The polymerisation temperature was maintained at 40° C. The reaction was stopped after 4 hours by the addition of methanol. Following the addition of 0.3% of 2,6-di-tert.-butyl-4-methyl phenol (based on solid polymer) as stabiliser, the polybutadiene was recovered by removing the cyclohexane by distillation with steam.

The polymer was dried in vacuo at 50° C. The yield amounted to 95%, based on the monomer used. IR-analysis: 1,4-cis=98.2%; 1,4-trans=1.1%; 1,2-=0.7%.

The polymer had the following properties:
Inherent viscosity: 3.41 dl/g
Mooney viscosity (ML-4', 100° C.): 50
Defo hardness (80° C.): 450p
Defo elasticity (80° C.): 18%.

The polymer was mixed on mixing rolls and vulcanised. The mixture and the vulcanisate were subjected to a comparative test with standard commercial grade polybutadienes obtained with cobalt (Co-Br), titanium (Ti-Br), nickel (Ni-Br) and lithium catalysts (Li-Br).

The following composition was used:

| | |
|---|---|
| Polybutadiene | 100 parts by weight |
| Zn O | 3.0 parts by weight |
| Stearic acid | 2.0 parts by weight |
| Carbon black (N330) | 60 parts by weight |
| Naphthenic oil | 15 parts by weight |
| Sulphur | 1.5 parts by weight |
| Vulkazit CZ ® [1] | 0.9 part by weight |

[1] = Benzothiazyl-2-tert.-butyl sulphenamide, a product of Bayer AG.

With all the commercial products used for comparison, distinct deficiencies in processibility occurred during production of the mixtures on mixing rolls, especially at temperatures above 50° C.

By contrast, the polybutadiene produced in accordance with the present invention showed excellent processing properties, even at temperatures of up to 90° C. A smooth rough sheet without any cracks or holes was immediately formed. The sheet remained smooth and coherent, even during and after addition of the composition components. It did not become detached from the roll. The properties of the vulcanisates are set out in Table 5.

By comparison with the known commmercial products, the U-Br is distinguished by high strength, high modulus and excellent elastic properties.

COMPARSION EXAMPLES 1–5

In order to demonstrate that the oxidation state of the uranium has a critical effect upon the quality of the catalysts, a few uranyl compounds were used for the polymerisation of butadiene under conditions which, in the case of uranium(IV)carboxylates, are suitable for the formation of active catalysts.

The catalysts were produced by the process described in Example (1a). Polymerisation was carried out, using cyclohexane as solvent, in the same way as described in Example (1b).

The results are set out in the following Table 6.

Table 6

| Comparison Example | Catalyst A | B | C | A:B:C (molar ratio) | Pre-formation time | Polymerisation Temp. | Time | Yield |
|---|---|---|---|---|---|---|---|---|
| 1 | $UO_2(CH_3CO_2)_2$ | $AlBr_3$ | $Al(iC_4H_9)_3$ | 1:0.5:25 | 2 h | 50° | 4 h | 18% |
| 2 | $UO_2(C_6H_5CO_2)_2$ | $AlBr_3$ | $Al(iC_4H_9)_3$ | 1:0.5:25 | 24 h | 25° | 24 h | 5% |
| 3 | $UO_2(C_6H_5CO_2)_2$ | $AlBr_3$ | $Al(C_2H_5)_3$ | 1:0.5:25 | 24 h | 25° | 24 h | 2% |
| 4 | $UO_2(C_6H_5CO_2)_2$ | $AlBr_3$ | $Al(C_8H_{17})_3$ | 1:0.5:25 | 24 h | 25° | 24 h | 7% |
| 5 | $UO_2(acac)_2$ | $AlBr_3$ | $Al(i-C_4H_9)_3$ | 1:0.5:25 | 2 h | 25° | 4 h | 7% |

COMPARISON EXAMPLES 6–8

These Examples are for the purpose of comparison and show that, even with carboxylates of uranium in the oxidation stage + 4as catalyst, a highly stereospecific polymerisation of butadiene with high yields is only obtained with the process according to the invention as illustrated in the preceding Examples is used, but not by the process disclosed in U.S. Pat. No. 3,676,411 which is illustrated by Examples with uranyl compounds.

160 ml of a 15% solution of butadiene in an inert solvent were introduced into a 500 ml glass bottle. 3 mMole of aluminium alkyl, 0.18 mMole of the uranium compounds and 0.2 mMole of diethyl aluminium chloride were then introduced in this order into the bottle which was then closed and introduced into a heatable bath.

The results are set out in the following Table 7.

Table 7

| Comparison Example | U-compound | Solvent | Al-alkyl | Reaction time | Temp. | Yield | Microstructure % 1,4-cis | % 1,4-trans | % 1,2 |
|---|---|---|---|---|---|---|---|---|---|
| 6 | $U(C_6H_4CO_2)_4$ | toluene | $Al(i-C_4H_9)_3$ | 24 h | 50° C | 17% | 85.9 | 11.4 | 2.8 |
| 7 | $U(ClC_6H_4CO_2)_4$ | toluene | $Al(i-C_4H_9)_3$ | 24 h | 50° C | 22% | 88.4 | 9.7 | 1.9 |
| 8 | $U(C_6H_5CO_2)_4$ | cyclohexane | $Al(i-C_4H_9)_3$ | 24 h | 50° C | 27% | 93.5 | 4.8 | 1.7 |

COMPARISON EXAMPLES 9–16

These Examples are for the purpose of comparison and show that the compounds mentioned in Italian Patent Specification No. 971,308, namely uranium(IV)-formate and uranium(IV)acetate, are unsuitable for the polymerisation of butadiene.

The catalysts were produced and polymerisation was carried out in the same way as described in Example (1a) and (1b)

The results are set out in the following Table 8.

Table 5

| | Co-BR | Ti-BR | Ni-BR | Li-BR | U-BR |
|---|---|---|---|---|---|
| Mixture viscosity (ML-4', 100° C.) | 77 | 92 | 66 | 106 | 80 |
| Tensile strength [MPa] | 14.0 | 12.5 | 13.9 | 9.2 | 14.9 |
| Elongation at break [%] | 450 | 385 | 455 | 375 | 490 |
| Modulus at 300 % [MPa] | 8.3 | 7.5 | 7.9 | 7.0 | 8.7 |
| Shore A hardness 23°/70° | 63/61 | 63/62 | 62/59 | 66/64 | 63/61 |
| Shock elasticity 23°/70° [%] | 51/55 | 47/50 | 46/50 | 48/50 | 53/53 |
| Tear propagation resistance [N] | 186 | 174 | 215 | 153 | 180 |

Table 8

| Comparison Example | A | B | C | A:B:C | Preformation time | Temperature | Time | Yield |
|---|---|---|---|---|---|---|---|---|
| 9 | U(HCO$_2$)$_4$ | AlBr$_3$ | Al(i-C$_4$H$_9$)$_4$ | 1:0.5:25 | 5 mins. | 25° | 23 h | <1% |
| 10 | " | " | " | " | 30 mins. | 25° | 23 h | <1% |
| 11 | " | " | " | " | 2 h | 25° | 23 h | <1% |
| 12 | " | " | " | " | 24 h | 25° | 23 h | <1% |
| 13 | U(CH$_3$CO$_2$)$_4$ | " | " | " | 19 h | 25° | 3 h | <1% |
| 14 | " | C$_2$H$_5$AlCl$_2$ | " | 1:1:25 | 19 h | 25° | 3 h | <1% |
| 15 | " | (C$_2$H$_5$)$_3$Al$_2$Cl$_3$ | " | 1:1:25 | 19 h | 25° | 3 h | <1% |
| 16 | " | (C$_2$H$_5$)$_2$AlCl | " | 1:1.5:25 | 19 h | 25° | 3 h | <1% |

We claim:

1. A uranium-containing organometallic mixed catalyst system comprising the reaction product of (a) and (b) mixed with (c), wherein (a) is a uranium salt of a carboxylic acid with uranium having the formal oxidation state +4 and the carboxylic acid having at least 3 carbon atoms, (b) is a Lewis acid and (c) is an aluminum trialkyl and/or dialkyl aluminum hydride.

2. A uranium-containing organometallic mixed catalyst as claimed in claim 1, wherein component (a) is a compound corresponding to the formula

U(OOCR)$_4$ in which R, which may be the same or different, represents an unsubstituted alkyl radical with 2 to 30 carbon atoms, the carboxyl group being attached to a primary, secondary or tertiary carbon atom, a cycloaliphatic alkyl radical with 3 to 12 carbon atoms or an aromatic radical with 6 to 24 carbon atoms and, still being the same or different, represents an already defined alkyl, cycloalkyl or aromatic radical substituted once or several times by halogen, hydroxy, nitro and/or amino groups or by

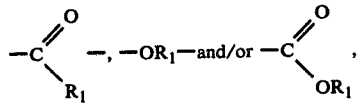

in which R$_1$ has the same meaning as the unsubstituted R, although the sum of the C-atoms present in R and R$_1$ in the case of the alkyl radical amounts to between 3 and 30.

3. A uranium-containing organometallic mixed catalyst as claimed in claim 2, wherein, in the formula indicated, R is the same or different and represent an alkyl radical with 2 to 17 carbon atoms, a cycloaliphatic radical with 5 to 7 carbon atoms or an aromatic radical with 6 to 18 carbon atoms.

4. A uranium-containing organometallic mixed catalyst as claimed in claim 1, wherein component (b) is an organometallic halide in which the metal atom belongs to Groups 2, 3 and 4 of the Periodic System or is a halide of the elements of Groups 3a, 4a, 4b, 5a, 6b, and 8 of the Periodic Table.

5. A uranium-containing organometallic mixed catalyst as claimed in claim 1, wherein the molar ratio between components (a) and (b) amounts to between 100:1 and 1:20, whilst the molar ratio between components (a) and (c) amounts to between 1:10 and 1:200.

6. A uranium-containing organometallic mixed catalyst as claimed in claim 1, wherein the molar ratio between components (a) and (b) amounts to between 5:1 and 1:10, whilst the molar ratio between components (a) and (c) amounts to between 1:20 and 1:80.

7. A process for producing the catalyst claimed in claim 1, wherein components (a) and (b) are initially reacted with one another, after which component (c) is added to the reaction product.

8. A process for the polymerisation of diolefins or mixtures of diolefins with monoolefins, wherein the uranium-containing organometallic catalyst as claimed in claim 1 as used.

9. A process for the polymerisation of diolefins or mixtures of diolefins with monoolefins as claimed in claim 8, wherein from 0.002 to 1.5 mMole of the catalyst, based on component (a), is used per 100 g of monomer.

* * * * *